United States Patent Office 3,305,560
Patented Feb. 21, 1967

3,305,560
3-PHTHALIDYL-2-INDOLINONES
Janis Plostnieks, Philadelphia, Pa., assignor to McNeil Laboratories, Incorporated, a corporation of Pennsylvania
No Drawing. Filed Oct. 22, 1965, Ser. No. 502,329
6 Claims. (Cl. 260—325)

This invention relates to novel organic compounds and to the preparation thereof and more particularly to certain 3-phthalidyl indolinones which may be represented by the following structural formula:

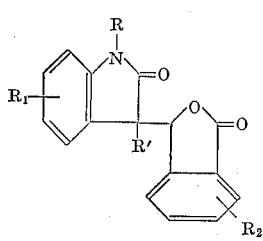

(I)

wherein R and R' are each a member selected from the group consisting of hydrogen, lower alkyl and aralkyl; $R_1$ is a member selected from the group consisting of hydrogen, lower alkyl, lower alkoxy, hydroxy and halo; and $R_2$ is a member selected from the group consisting of hydrogen, halo, lower alkoxy and nitro.

As used herein, lower alkyl and lower alkoxy preferably have from 1 to 5 carbon atoms, including straight or branched saturated aliphatic chains, such as, for example, methyl, ethyl, propyl, isopropyl, butyl, isobutyl, secondary-butyl, pentyl and the like, and, respectively, methoxy, ethoxy, propoxy, isopropoxy, etc.; and halo includes chloro, bromo, fluoro and iodo. The preferred aralkyl is benzyl.

The novel compounds of Formula I absorb ultra-violet (U.V.) light and, accordingly, can be employed as effective U.V. screens when incorporated in suitable vehicles such as transparent film-forming compositions and oils. In addition, several of the compounds have useful pharmacological properties: for example, when R' is other than hydrogen, the compounds have central nervous system (CNS) stimulant activity. Furthermore, several of the subject compounds I are useful in chemical synthesis: for example, in the preparation of spiro(indan-2,3'-indoline)-1,2'-diones, as described in my copending application Serial No. 502,270, and in the preparation of 6H-benzo[5,6]cyclohept[1,2,3-cd]indolin-1,6-diones, as described in my copending application Serial No. 502,271.

The subject compounds (I) may be advantageously prepared by reacting a 2-indolinone of Formula II with a phthaladehydic acid of Formula III, wherein R, R', $R_1$ and $R_2$ are as previously described, in the presence of a base such as, for example, an alkali metal hydroxide or lower alkoxide, e.g., sodium hydroxide, potassium hydroxide, sodium ethoxide, potassium tert-butoxide and the like; and tertiary amines such as, for example, trialkyl amines, e.g., triethylamine, tributylamine and the like, and heterocyclic amines, e.g., pyridine, N-alkyl piperidine, N-alkyl morpholine, quinoline and the like. The reaction is advantageously carried out in suitable organic solvents such as, for example, lower alkanols, e.g., methanol, tert-butanol and the like; and ethers, e.g., tetrahydrofuran, dioxane, ethylene glycol dimethyl ether and the like. Among the preferred bases and solvents are triethylamine and methanol, respectively. Elevated temperatures may be advantageously employed. The reaction scheme may be illustrated as follows:

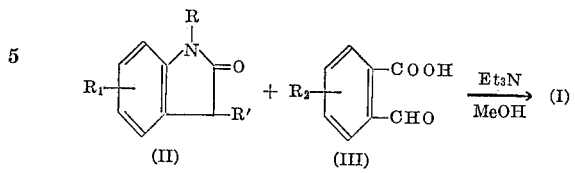

When R' is hydrogen, it is believed that the corresponding subject compounds may exist in the following tautomeric forms:

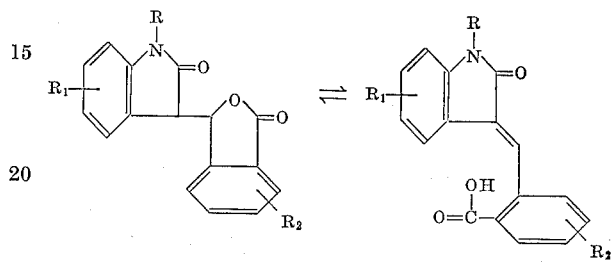

Due to the structural configuration of the subject compounds (I), when R' is other than hydrogen, it is evident that their existence in the form of several stereoisomers is possible. It is intended that all such tautomeric forms and isomers are included within the scope of this invention.

The following examples are intended to illustrate, but not to limit, the scope of the present invention.

Example I 1-methyl-3-ethyl-2-indolinone (25 g., 0.165 mole) is suspended in 100 ml. of methanol. To this suspension is added triethylamine (16.5 ml., 0.165 mole) and phthalaldehydic acid (33 g., 0.165 mole). The reaction mixture is stirred and heated under reflux for 48 hours. The solution is evaporated in vacuo, and the oily residue is dissolved in chloroform and washed with sodium bicarbonate solution three times and 4 N hydrochloric acid once. The chloroform solution is dried over anhydrous magnesium sulfate, filtered, and evaporated in vacuo, yielding a white solid. The solid is washed with boiling hexane several times to remove unreacted oxindole. The solid is then filtered and recrystallized from ethyl acetate, yielding a white crystalline material, 1-methyl-3-ethyl-3-phthalidyl-2-indolinone; M.P. 143–165° C.

*Analysis.*—Calculated for $C_{19}H_{17}NO_3$: C, 74.25; H, 5.58; N, 4.56%. Found: C, 74.56; H, 5.57; N, 4.70%.

Example II

The procedure of Example I is followed except that an equivalent quantity of 3-benzyl-2-indolinone,
3-ethyl-2-indolinone,
3-propyl-2-indolinone,
1,3-dimethyl-2-indolinone,
3,6-dimethyl-2-indolinone,
1-methyl-3-ethyl-5-hydroxy-2-indolinone,
1-methyl-3-ethyl-5-methoxy-2-indolinone,
1,3-dimethyl-7-hydroxy-2-indolinone,
1,3-dimethyl-5-hydroxy-2-indolinone,
3-methyl-5-chloro-2-indolinone,
and 3-propyl-5-ethoxy-2-indolinone, respectively, is used in place of the 1-methyl-3-ethyl-2-indolinone used therein to yield, as respective products, the 3-benzyl,
3-ethyl, 3-propyl,
1,3-dimethyl,
3,6-dimethyl,
1-methyl-3-ethyl-5-hydroxy,
1-methyl-3-ethyl-5-methoxy,
1,3-dimethyl-7-hydroxy,
1,3-dimethyl-5-hydroxy,
3-methyl-5-chloro, and 3-propyl-5-ethoxy derivatives of 3-phthalidyl-2-indolinone.

*Example III*

The procedure of Example I is followed except that an equivalent quantity of 5-chloro-phthalaldehydic acid, 5-nitro-phthaladehydic acid, 3-nitro-phthalaldehydic acid, 3-methoxy-phthalaldehydic acid, 4-methoxy-phthalaldehydic acid, 5-methoxy-phthalaldehydic acid, and 6-hydroxy-phthalaldehydic acid, respectively, is used in place of the phthalaldehydic acid used therein to yield, as respective products, 1-methyl-3-ethyl-3-(6'-chloro-phthalidyl)-2-indolinone,
1-methyl-3-ethyl-3-(6'-nitro-phthalidyl)-2-indolinone,
1-methyl-3-ethyl-3-(4'-nitro-phthalidyl)-2-indolinone,
3-benzyl-3-(7'-hydroxy-phthalidyl)-2-indolinone,
linone,
1-methyl-3-ethyl-3-(4'-methoxy-phthalidyl)-2-indolinone,
1-methyl-3-ethyl-3-(5'-methoxy-phthalidyl)-2-indolinone,
1-methyl-3-ethyl-3-(6'-methoxy-phthalidyl)-2-indolinone, and
1-methyl-3-ethyl-3-(7'-hydroxy-phthalidyl)-2-indolinone.

*Example IV*

In accordance with the foregoing procedures, and by using equivalent quantities of the appropriate substituted 2-indolinones in Example II and substituted phthalaldehydic acids in Example III as starting reactants, the following products are obtained:

3-benzyl-3-(6'-nitro-phthalidyl)-2-indolinone;
3-benzyl-3-(5'-methoxy-phthalidyl)-2-indolinone;
3-benzyl-3-(6'-chloro-phthalidyl)-2-indolinone;
3-benzyl-3-(7'-hydroxy-phthalidyl)-2-indolinone;
3-ethyl-3-(4'-nitro-phthalidyl)-2-indolinone;
3-propyl-3-(6'-methoxy-phthalidyl)-2-indolinone;
1,3-dimethyl-3-(6'-chloro-phthalidyl)-2-indolinone;
3,6-dimethyl-(6'-nitro-phthalidyl)-2-indolinone;
1-methyl-3-ethyl-5-hydroxy-3(4'-methoxy-phthalidyl)-2-indolinone;
1-methyl-3-ethyl-5-methoxy-3-(4'-nitro-phthalidyl)-2-indolinone;
1,3-dimethyl-7-hydroxy-3-(7'-hydroxy-phthalidyl)-2-indolinone;
3-methyl-5-chloro-3-(6'-nitro-phthalidyl)-2-indolinone; and 3-propyl-5-ethoxy-3-(5'-methoxy-phthalidyl)-2-indolinone.

*Example V*

1-methyl-2-indolinone (20 g., 0.15 mole) is suspended in 100 ml. of methanol and 18 ml. of triethylamine. 24 grams (0.15 mole) of phthalaldehydic acid is added over a five minute period. The reaction mixture is heated under reflux for 2 hours. The final solution is cooled in an ice bath and a yellow solid precipitates. The precipitate is removed by filtration and the methanol evaporated in vacuo. The combined residues are dissolved in methylene chloride and washed with 1 N hydrochloric acid. The methylene chloride layer is dried over anhydrous magnesium sulfate and filtered. Evaporation of the solvent yields an amorphous yellow material. Crystallization from dimethylformamide (DMF) and water yields a yellow solid, 1-methyl-3-phthalidyl-2-indolinone, M.P. 203–205° C. Recrystallization from DMF-water raises the M.P. to 209–211° C.

*Analysis.*—Calculated for $C_{17}H_{13}NO_3$: C, 73.11; H, 4.69; N, 5.02%. Found: C, 72.65; H, 4.74; N, 5.30%.

*Example VI*

The procedure of Example V is followed except that an equivalent quantity of the 1-ethyl, 1-benzyl, 4-methyl, 5-methyl, 6-methyl, 7-methyl, 1,7-dimethyl, 4-chloro, 4-iodo, 5-bromo, 5-chloro, 1-methyl-5-methoxy, 1-methyl-6-ethoxy, 5-hydroxy and 1-methyl-5-chloro derivative, respectively, of 2-indolinone is used in place of the 1-methyl-2-indolinone used therein to yield, as respective products, the corresponding 1-ethyl, 1-benzyl, 4-methyl, 5-methyl, 6-methyl, 7-methyl, 1,7-dimethyl, 4-chloro, 4-iodo, 5-bromo, 5-chloro, 1-methyl-5-methoxy, 1-methyl-6-ethoxy, 5-hydroxy and 1-methyl-5-chloro derivative of 3-phthalidyl-2-indolinone.

*Example VII*

2-indolinone (24 g., 0.18 mole) is suspended in 100 ml. of methanol. To this suspension is added 27 g. (0.18 mole) of phthalaldehydic acid and 18.2 g. (0.18 mole) of triethylamine. The reaction mixture is stirred and heated under reflux for 3 hours. The solution is evaporated in vacuo, giving an oily residue which is suspended in 4 N hydrochloric acid. The suspension is warmed slightly and yellow crystals precipitate. The solid is filtered and dried, yielding a yellow solid, 3-phthalidyl-2-indolinone; M.P. 239–244° C. Recrystallization from dimethylformamide and water gives a M.P. of 241–244° C.

*Analysis.*—Calculated for $C_{16}H_{11}NO_3$: C, 72.44; H, 4.18; N, 5.28%. Found: C, 71.51; H, 4.38; N, 5.09%.

*Example VIII*

(A) By following the procedure of Example VII, except that an equivalent quantity of the 5-chloro, 3-methoxy, 4-methoxy, 5-methoxy, 3-nitro and 5-nitro derivative, respectively, of phthalaldehydric acid is used in place of the phthalaldehydic acid used therein, there are obtained, as respective products, 3-(6'-chloro-phthalidyl)-2-indolinone, 3-(4'-methoxy-phthalidyl) - 2 - indolinone, 3-(5'-methoxy-phthalidyl)-2-indolinone, 3-(6' - methoxy-phthalidyl)-2-indolinone, 3-(4'-nitro-phthalidyl)-2 - indolinone, and 3-(6'-nitro-phthalidyl)-2-indolinone.

(B) The corresponding 1-methyl derivative of the various 3-($R_2$-substituted-phthalidyl)-2-indolinones prepared in Example VIII–A is obtained by reacting equivalent quantities of 1-methyl-2-indolinone with the respective $R_2$-substituted-phthalaldehydic acids described in Example VIII–A according to the procedure therein.

*Example IX*

In accordance with the procedures of the foregoing examples, and by starting with an equivalent quantity of and appropriately substituted 2-indolinone and phthalaldehydic acid, the following respective products are obtained:

1-benzyl-3-(6'-chloro-phthalidyl)-2-indolinone,
1-ethyl-3-(4'-methoxy-phthalidyl)-2-indolinone,
6-methyl-3-(7'-hydroxy-phthalidyl)-2-indolinone,
1,7-dimethyl-3-(4'-nitro-phthalidyl)-2-indolinone,
5-chloro-3-(6'-methoxy-phthalidyl)-2-indolinone,
5-hydroxy-3-(5'-methoxy-phthalidyl)-2-indolinone,
1-methyl-5-methoxy-3-(6'-nitro-phthalidyl)-2-indolinone,
1-methyl-6-ethoxy-3-(6'-chloro-phthalidyl)-2-indolinone,
1-methyl-5-chloro-3-(4'-methoxy-phthalidyl)-2-indolinone,
1-ethyl-3-(6'-chloro-phthalidyl)-2-indolinone, and
6-methyl-3-(5'-methoxy-phthalidyl)-2-indolinone.

What is claimed is:
1. 3-phthalidyl-2-indolinone of the formula:

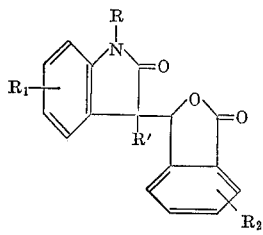

wherein R and R' are each a member selected from the group consisting of hydrogen, lower alkyl and benzyl; $R_1$ is a member selected from the group consisting of hydrogen, lower alkyl, lower alkoxy, hydroxy and halo; and $R_2$ is a member selected from the group consisting of hydrogen, halo, lower alkoxy and nitro.
2. 3-phthalidyl-2-indolinone.
3. 1-lower alkyl-3-phthalidyl-2-indolinone.
4. 1-methyl-3-phthalidyl-2-indolinone.
5. 1,3-di-(lower alkyl)-3-phthalidyl-2-indolinone.
6. 1-methyl-3-ethyl-3-phthalidyl-2-indolinone.

No references cited.

ALEX MAZEL, *Primary Examiner.*
MARY O'BRIEN, *Assistant Examiner.*